US012593295B2

(12) United States Patent
Watfa et al.

(10) Patent No.: US 12,593,295 B2
(45) Date of Patent: Mar. 31, 2026

(54) METHOD AND APPARATUS FOR CONTROLLING PDU SESSION

(71) Applicant: SAMSUNG ELECTRONICS CO., LTD., Suwon-si (KR)

(72) Inventors: Mahmoud Watfa, Chertsey (GB); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 17/662,809

(22) Filed: May 10, 2022

(65) Prior Publication Data

US 2022/0361136 A1 Nov. 10, 2022

(30) Foreign Application Priority Data

May 10, 2021 (IN) .............................. 202131021099
Apr. 27, 2022 (GB) ...................................... 2206125

(51) Int. Cl.
*H04W 48/04* (2009.01)
*H04W 36/32* (2009.01)
*H04W 48/16* (2009.01)
*H04W 60/04* (2009.01)
*H04W 36/00* (2009.01)

(52) U.S. Cl.
CPC ......... *H04W 60/04* (2013.01); *H04W 36/324* (2023.05); *H04W 48/04* (2013.01); *H04W 48/16* (2013.01); *H04W 36/0022* (2013.01)

(58) Field of Classification Search
None
See application file for complete search history.

(56) References Cited

U.S. PATENT DOCUMENTS

| 2019/0159095 A1* | 5/2019 | Niemi | ................... H04W 36/22 |
| 2019/0159157 A1 | 5/2019 | Gupta | |
| 2019/0387369 A1* | 12/2019 | Kaura | ..................... H04W 8/02 |

(Continued)

FOREIGN PATENT DOCUMENTS

| WO | 2019010633 A1 | 1/2019 |
| WO | 2020032101 A1 | 2/2020 |
| WO | 2022186591 A1 | 9/2022 |

OTHER PUBLICATIONS

International Search Report and Written Opinion of the International Searching Authority dated Aug. 12, 2022, in connection with International Application No. PCT/KR2022/006683, 8 pages.

(Continued)

*Primary Examiner* — Anez C Ebrahim

(57) ABSTRACT

The disclosure relates to a 5G or 6G communication system for supporting a higher data transmission rate. According to an embodiment, the method comprises establishing at least one PDU connection in an S1 mode; performing an inter system change from the S1 mode to an N1 mode; and in case that a successful UE-requested PDU session modification procedure is not previously performed and the UE is in a 5GMM-REGISTERED.NON-ALLOWED-SERVICE state, performing a UE-requested PDU session modification procedure to report 5G session management (5GSM) capability of the UE after entering a 5GMM-REGISTERED.NORMAL-SERVICE state.

16 Claims, 5 Drawing Sheets

(56) References Cited

U.S. PATENT DOCUMENTS

| | | | | |
|---|---|---|---|---|
| 2020/0137710 A1* | 4/2020 | Surisetty | ................. | H04W 8/02 |
| 2020/0177333 A1* | 6/2020 | Liu | ........................ | H04W 76/25 |
| 2020/0404609 A1 | 12/2020 | Huang-Fu et al. | | |
| 2022/0095260 A1* | 3/2022 | Shan | ..................... | H04W 60/04 |
| 2023/0422198 A1* | 12/2023 | Kuppelur | .............. | H04W 60/02 |

OTHER PUBLICATIONS

United Kingdom Intellectual Property Office, "Combined Search and Examination Report under Sections 17 and 18(3)," in connection with GB Patent Application No. 2206125.3, dated Oct. 7, 2022, 6 pages.

Huawei et al., "PDU session modification for C2 communication," 3GPP TSG-CT WG1 Meeting #129-e, C1-212143, Electronic meeting, Apr. 19-23, 2021, 7 pages.

Huawei et al., "Correction to NR TC 11.1.4-Fallback with redirection," 3GPP TSG-RAN5 Meeting #91-e, R5-212425, Electronic Meeting, May 17-28, 2021, 14 pages.

InterDigital, "C2 pairing authorization at PDU session modification," 3GPP TSG-CT WG1 Meeting #129-e, C1-212483, Electronic meeting, Apr. 19-23, 2021, 8 pages.

Huawei et al., "Apply service area restrictions in NAS procedures," 3GPP TSG-CT WG1 Meeting #112bis, C1-186996, Vilnius (Lithuania), Oct. 15-19, 2018, 24 pages.

Examination Report dated Mar. 12, 2025 in connection to GB Application No. GB2206125.3, 4 pages.

Examination Report issued Mar. 18, 2024, in connection with United Kingdom Patent Application No. GB2206125.3, 3 pages.

* cited by examiner

METHOD AND APPARATUS FOR CONTROLLING PDU SESSION

CROSS-REFERENCE TO RELATED APPLICATIONS

This application is based on and claims priority under 35 U.S.C. § 119(e) to Indian Patent Application 202131021099, filed May 10, 2021, and United Kingdom Patent Application 2206125.3, filed Apr. 27, 2022, the disclosures of which are incorporated by reference herein in their entirety.

BACKGROUND

1. Field

The present application relates to control a protocol data unit (PDU) session, more specifically, the present application relates to perform a PDU session modification after an inter-system change in a restricted service area.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

In one embodiment, a method performed by a user equipment (UE) in a network is provided. The method includes establishing at least one PDU connection in a S1 mode; performing an inter system change from the S1 mode to a N1 mode; and in case that a successful UE-requested PDU session modification procedure is not previously performed and the UE is in a 5GMM-REGISTERED.NON-ALLOWED-SERVICE state, performing a UE-requested PDU session modification procedure to report 5G session management (5GSM) capability of the UE after entering a 5GMM-REGISTERED.NORMAL-SERVICE state.

In another embodiment, a method performed by a session management function (SMF) in a network is provided. The method includes in case that an inter system change from a S1 mode to a N1 mode is performed at a user equipment (UE), a successful UE-requested PDU session modification procedure is not previously performed for the UE and the UE is in a 5GMM-REGISTERED.NON-ALLOWED-SER-VICE state, receiving a PDU session modification request from the UE after a state of the UE is transited from the 5GMM-REGISTERED.NON-ALLOWED-SERVICE state to a 5GMM-REGISTERED. NORMAL-SERVICE state; and obtaining information regarding the 5GSM capability from the PDU session modification request.

In another embodiment, a UE is provided. The UE includes a transceiver; and a processor coupled with the transceiver and configured to: establish at least one PDU connection in a S1 mode, perform an inter system change from the S1 mode to a N1 mode, and in case that a successful UE-requested PDU session modification procedure is not previously performed and the UE is in a 5GMM-REGIS-TERED.NON-ALLOWED-SERVICE state, perform a UE-requested PDU session modification procedure to report 5G session management (5GSM) capability of the UE after entering a 5GMM-REGISTERED.NORMAL-SERVICE state.

In another embodiment, a session management function (SMF) in a network is provided. The SMF comprising: a transceiver; and a processor coupled with the transceiver and configured to: in case that an inter system change from a S1 mode to a N1 mode is performed at a user equipment (UE), a successful UE-requested PDU session modification procedure is not previously performed for the UE and the UE is in a 5GMM-REGISTERED.NON-ALLOWED-SER-VICE state, receive a PDU session modification request from the UE after a state of the UE is transited from the 5GMM-REGISTERED.NON-ALLOWED-SERVICE state to a 5GMM-REGISTERED.NORMAL-SERVICE state, and obtain information regarding the 5GSM capability from the PDU session modification request.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
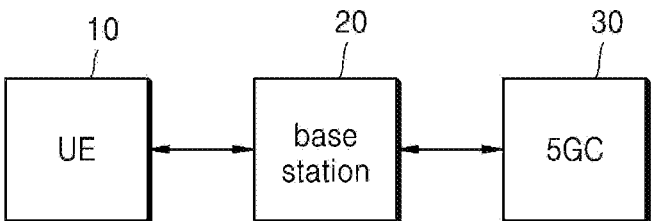
FIG. 1 illustrates a schematic of a network comprising a base station and a UE according to an embodiment of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In order to understand the background, it is instructive to examine a first Packet Data Network, PDN, connection transfer from S1 mode (EPS) to N1 mode (5GS).

The UE may start in S1 mode, where the establishes a PDN connection and thereafter performs an inter-system change from S1 mode to N1 mode and transfers the session to N1 mode. When this happens, noting that this is the first inter-system change from S1 mode to N1 mode and the PDN connection was established in S1 mode, the UE may perform a PDU session modification procedure (i.e., send a PDU session modification request message) in order to provide the UE's 5GSM capabilities to the session management function, SMF, that handles the PDU session. This behaviour is specified in 3GPP standard TS 24.501 as shown below:

"One of the purposes of the UE-requested PDU session modification procedure is to indicate to the network the relevant 5GSM parameters and capabilities (e.g., the UE's 5GSM capabilities, whether the UE supports more than 16 packet filters, the maximum data rate per UE for user-plane integrity protection supported by the UE for uplink, the maximum data rate per UE for user-plane integrity protection supported by the UE for downlink and whether the UE requests the PDU session to be an always-on PDU session in the 5GS) for a PDN connection established when in S1 mode, after the first inter-system change from S1 mode to N1 mode, if the UE is a UE operating in single-registration mode in a network supporting N26 interface.

As can be seen above, the PDU session modification procedure is mandatory after the first inter-system change from S1 mode to N1 mode.

One of the mobility restrictions that exists in 5GS is the service area restriction which defines the concept of "an allowed area" or "non-allowed area." Note that hereafter, an allowed area can either mean that the UE is in an allowed area or that the UE is not in a non-allowed area. Similarly, a non-allowed area can either mean that the UE is in a non-allowed area or the UE is not in an allowed area. These can be considered explicit and implicit indications.

The service area restriction is indicated to the UE via the Service area list information element (IE), where the tracking area identity, TAI, contains either an allowed area or a non-allowed area, where any of these areas is a list of TAIs. The following is from 3GPP standard specification TS 24.501:

"The service area restrictions consist of tracking areas forming either an allowed area, or a non-allowed area. The tracking areas belong to either the registered PLMN or its equivalent PLMNs in the registration area. The allowed area can contain up to 16 tracking areas or include all tracking areas in the registered PLMN and its equivalent PLMN(s) in the registration area. The non-allowed area can contain up to 16 tracking areas. The network conveys the service area restrictions to the UE by including either an allowed area, or a non-allowed area, but not both, in the service area list IE of a REGISTRATION ACCEPT message or a CONFIGU-RATION UPDATE COMMAND message.

If the network does not convey the service area restrictions to the UE in the service area list IE of a REGISTRA-TION ACCEPT message, the UE may treat all tracking areas in the registered PLMN and its equivalent PLMN(s) in the registration area as allowed area and delete the stored list of "allowed tracking areas" or the stored list of "non-allowed tracking areas."

When the UE receives a service area list IE with an allowed area indication during a registration procedure or a generic UE configuration update procedure:

a) if the "Type of list" included in the service area list IE does not indicate "all TAIs belonging to the PLMNs in the registration area are allowed area," the UE may delete the old list of "allowed tracking areas" and store the tracking areas in the allowed area as the list of "allowed tracking areas." If the UE has a stored list of "non-allowed tracking areas," the UE may delete that list; or b) if the "Type of list" included in the service area list IE indicates "all TAIs belonging to the PLMNs in the registration area are allowed area," the UE may treat all tracking areas in the registered PLMN and its equivalent PLMN(s) as allowed area and delete the stored list of "allowed tracking areas" or the stored list of "non-allowed tracking areas."

When the UE receives a service area list IE with a non-allowed area indication during a registration procedure or a generic UE configuration update procedure, the UE may delete the old list of "non-allowed tracking areas" and store the tracking areas in the non-allowed area as the list of "non-allowed tracking areas." If the UE has a stored list of "allowed tracking areas," the UE may delete that list.

If the UE is successfully registered to a PLMN and has a stored list of "allowed tracking areas":

a) while camped on a cell whose TAI is in the list of "allowed tracking areas," the UE may stay in, or enter, the state 5GMM-REGISTERED.NORMAL-SERVICE and is allowed to initiate any 5GMM and 5GSM procedures; and b) while camped on a cell which is in the registered PLMN or a PLMN from the list of equivalent PLMNs and whose TAI is not in the list of "allowed tracking areas," the UE may enter the state 5GMM-REGIS-TERED.NON-ALLOWED-SERVICE, and:

1) if the UE is in 5GMM-IDLE mode or 5GMM-IDLE mode with suspend indication over 3GPP access, the UE:

i) may not include the Uplink data status IE in the registration procedure for mobility and periodic registration update except for emergency services or for high priority access;

ii) may not perform the registration procedure for mobility and periodic registration update with Follow-on request indicator set to "Follow-on request pending," except for:
emergency services;
high priority access;
indicating a change of 3GPP PS data off UE status;
sending an SOR transparent container;
sending a UE policy container; or
sending UE parameters update transparent container;

iii) may not initiate a service request procedure or request the lower layers to resume a suspended connection, except for:
emergency services;
emergency services fallback;
high priority access;
responding to paging;
responding to notification received over non-3GPP access;
indicating a change of 3GPP PS data off UE status;
sending an SOR transparent container;
sending a UE policy container; or
sending UE parameters update transparent container; and 2) if the UE is in 5GMM-CONNECTED mode or 5GMM-CONNECTED mode with RRC inactive indication over 3GPP access, the UE:

i) may not perform the registration procedure for mobility and periodic registration update with Uplink data status IE except for emergency services or for high priority access;

ii) may not initiate a service request procedure except for:
emergency services;
emergency services fallback;
high priority access;
responding to paging or responding to notification received over non-3GPP access;

iii) may not initiate a 5GSM procedure except for:
emergency services;
high priority access; or
indicating a change of 3GPP PS data off UE status; and iv) may not perform the NAS transport procedure except for the sending:
SMS;

an LPP message;

a location services message;

an SOR transparent container;

a UE policy container;

a UE parameters update transparent container; or a CIoT user data container.

NOTE 1: The contents of CIoT user data container can be data that is not for exception reports, or data that is for exception reports if allowed for the UE as described in 3GPP standard specification.

If the UE is successfully registered to a PLMN and has a stored list of "non-allowed tracking areas":

a) while camped on a cell which is in the registered PLMN or a PLMN from the list of equivalent PLMNs and whose TAI is not in the list of "non-allowed tracking areas," the UE may stay in, or enter, the state 5GMM-REGISTERED.NORMAL-SERVICE and is allowed to initiate any 5GMM and 5GSM procedures; and b) while camped on a cell whose TAI is in the list of "non-allowed tracking areas," the UE may enter the state 5GMM-REGISTERED.NON-ALLOWED-SER-VICE, and:

1) if the UE is in 5GMM-IDLE mode or 5GMM-IDLE mode with suspend indication over 3GPP access, the UE:

i) may not include the Uplink data status IE in the registration procedure for mobility and periodic registration update except for emergency services or for high priority access;

ii) may not perform the registration procedure for mobility and periodic registration update with Follow-on request indicator set to "Follow-on request pending," except for:

emergency services;

high priority access;

indicating a change of 3GPP PS data off UE status;

sending an SOR transparent container;

sending a UE policy container; or sending UE parameters update transparent container; and iii) may not initiate a service request procedure or request the lower layers to resume a suspended connection, except for:

emergency services;

emergency services fallback;

high priority access;

responding to paging;

responding to notification received over non-3GPP access;

indicating a change of 3GPP PS data off UE status;

sending an SOR transparent container;

sending a UE policy container; or sending UE parameters update transparent container; and 2) if the UE is in 5GMM-CONNECTED mode or 5GMM-CONNECTED mode with RRC inactive indication over 3GPP access, the UE:

i) may not perform the registration procedure for mobility and registration update with the Uplink data status IE except for emergency services or for high priority access;

ii) may not initiate a service request procedure or request the lower layers to resume a suspended connection, except for:

emergency services;

emergency services fallback;

high priority access; or responding to paging or responding to notification received over non-3GPP access;

iii) may not initiate a 5GSM procedure except for:

emergency services;

high priority access; or indicating a change of 3GPP PS data off UE status; and iv) may not perform the NAS transport procedure except for the sending:

SMS;

an LPP message;

a location services message;

an SOR transparent container;

a UE policy container;

a UE parameters update transparent container; or a CIoT user data container.

NOTE 2: The contents of CIoT user data container can be data that is not for exception reports, or data that is for exception reports if allowed for the UE as described in 3GPP standard specification.

The list of "allowed tracking areas," as well as the list of "non-allowed tracking areas" may be erased when:

a) the UE is switched off; and b) the UICC containing the USIM is removed or an entry of the "list of subscriber data" with the SNPN identity of the SNPN is updated.

When a tracking area is added to the list of "5GS forbidden tracking areas for roaming" or to the list of "5GS forbidden tracking areas for regional provision of service" as specified in the subclauses 5.5.1.2.5 or 5.5.1.3.5, the tracking area may be removed from the list of "allowed tracking areas" if the tracking area is already present in the list of "allowed tracking areas" and from the list of "non-allowed tracking areas" if the tracking area is already present in the list of "non-allowed tracking areas."

From the above it can be seen that the UE in a restricted service area is not allowed to send a 5GSM message except for emergency services, the UE is a high priority access UE, or to indicate a change of 3GPP packet switch (PS) data off UE status.

A problem experienced in the prior art, as defined by the above portion of the specification is that a UE is unable to perform PDU session modification after the first inter-system change from S1 mode to N1 mode, when the UE is in a restricted service area.

The specification above requires the UE to perform a PDU session modification (i.e., send a 5GSM message) after the first inter-system change from S1 mode to N1 mode.

However, the registration accept message may contain a service area list IE indicating that the current TAI (or cell in this TAI) is a non-allowed TAI and, as such, the UE ends up in a restricted service area upon the UE's first inter-system change from S1 mode to N1 mode. Moreover, the UE may not send any 5GSM message unless the message is related to an emergency PDU session, or the UE is a high priority access UE, or the UE wants to indicate a change of 3GPP PS data off UE status.

Given the above, the UE, after the first inter-system change from S1 mode to N1 mode, may end up in a restricted service area and in a situation that requires:

i. The UE to send a PDU session modification request message, because this is the first inter-system change from S1 mode to N1 mode, and ii. The UE to not send any 5GSM message because of the service area restriction.

The above two events are contradictory and hence a solution is required to avoid the contradiction, so as to achieve a clear and predictable UE behaviour.

It is an aim of embodiments of the present disclosure to address and at least partially overcome such issues, as well as other issues not explicitly mentioned herein.

According to the present disclosure there is provided an apparatus and method as set forth in the appended claims. Other features of the disclosure will be apparent from the dependent claims, and the description which follows.

According to a first aspect of the present disclosure, there is provided a method of operating a UE in connection with a telecommunication network, comprising the steps of:

a) the UE performing an inter-system change from S1 mode to N1 mode;

b) the UE determining that the UE needs to perform a PDU session modification procedure to report the UE's 5GSM capabilities;

c) the UE determining if the UE is located in a restricted service area;

d) if the UE determines that the UE is in a restricted service area, then the UE determines if a further condition is true; and e) if the further condition is true, then the UE sends a 5GSM message to the telecommunication network.

In an embodiment, the UE sends a 5GSM message to the telecommunication network only after the UE leaves the restricted service area.

In an embodiment, the UE sends a 5GSM message to the telecommunication network when the UE enters substate 5GMM-REGISTERED.NORMAL-SERVICE after leaving the substate 5GMM-REGISTERED. NON-ALLOWED-SERVICE.

In an embodiment, after the UE performs the inter-system change from S1 mode to N1 mode, the UE receives from the telecommunication network a registration accept message including a service area list information element.

In an embodiment, after the UE receives registration accept message including a service area list information element, it determines that there is a 5GSM message to send to the telecommunication network.

In an embodiment, the further condition is one or more of:

the UE is performing an inter-system change from S1 mode to N1 mode;

the UE has not previously successfully performed a UE initiated PDU session modification procedure to report the UE's 5GSM capabilities;

the has a PDN connection that was established in S1 mode;

the UE is operating in single registration mode; or the network supports N26 interface.

According to a second aspect of the present disclosure, there is provided a UE operable to perform the method of the first aspect.

Although a few preferred embodiments of the present disclosure have been shown and described, it will be appreciated by those skilled in the art that various changes and modifications should be made without departing from the scope of the disclosure, as defined in the appended claims.

For a better understanding of the disclosure, and to show how embodiments of the same may be carried into effect, reference will now be made, by way of example only, to the accompanying diagrammatic drawings in which:

FIG. 1 illustrates a general schematic of a UE 10, according to an embodiment of the present disclosure. It is in 2-way communication with a base station 20. The base station may be a gNB. The base station 20 is in 2-way communication with a 5G Core Network, 5GC 30. Components shown here are adapted as described in the following to for embodiments of the present disclosure.

Embodiments of the present disclosure provide that a new exception is defined for the UE in the restricted service area such that, if the UE is in a restricted service area after a first inter-system change from S1 mode to N1 mode, then the UE is permitted to send a 5GSM message (e.g., a PDU session modification request message) even if the 5GSM message is not for emergency, or even if the UE is not a UE that is configured for high priority access UE, or even if the UE is not sending the 5GSM message to indicate a change of 3GPP PS data off UE status. The UE does so to report the UE's 5GSM capabilities to the SMF.

As such, when the UE receives a registration accept message, the UE verifies if the service area list IE is included. If so, the UE further verifies if the UE is in a restricted service area, and if the UE is in a restricted service area (e.g., the UE enters substate 5GMM-REGISTERED-.NON-ALLOWED-SERVICE), and if the UE determines that this is the first inter-system change from S1 mode to N1 mode, then the UE sends the 5GSM message (e.g., PDU session modification request message). Alternatively, if the UE is in a restricted service area, and if the UE determines that this is not the first inter-system change from S1 mode to N1 mode, then the UE may not send any 5GSM message except if the 5GSM message (or 5GSM procedure) is for emergency services, or if the UE is a high priority access UE, or if the 5GSM message (or 5GSM procedure) is to indicate a change of 3GPP PS data off UE status.

Alternatively, the UE verifies whether the PDU session modification procedure has been successfully performed or not, regardless of the number of inter-system changes that have been performed. For example, the UE may perform a first inter-system change from S1 mode to N1 mode, but the PDU session modification was not successful. Then the UE may perform an inter-system change from N1 mode to S1 mode, and then again from S1 mode to N1 mode. As such, this becomes the second inter-system change from S1 mode to N1 mode. Therefore, the UE may optionally, not necessarily, verify the number of inter-system changes that have been done but rather whether a successful PDU session modification procedure has been performed following an inter-system change from S1 mode to N1 mode. As such, after an inter-system change from S1 mode to N1 mode, the UE may verify if a PDU session modification procedure has been successfully (previously) performed or not (e.g., to report the UE's 5GSM capabilities). If not, and if the UE verifies that the UE is in a non-allowed area (or outside of an allowed area) as described above, then the UE sends the 5GSM message (e.g., PDU session modification request message).

Otherwise, if the UE is not in a restricted service area, then the UE can send the 5GSM message.

Note that for any of the above scenarios, then the UE may also verify if the UE has a PDN connection that was established in S1 mode and optionally that the UE wants to transfer the session to N1 mode, or the UE is operating in single registration mode or the UE has received the interworking without N26 interface indicator set to "interworking without N26 interface not supported" from the network (i.e., the network supports the N26 interface)

Note that the above sets out a few conditions that the UE needs to check. However, the order in which these conditions are checked may be different, where the conditions can be any combination of the following, for example:

The UE is performing a first inter-system change from S1 mode to N1 mode;

The has a PDN connection that was established in S1 mode;

The UE is operating in single registration mode;

The network supports the N26 interface;

The UE is in a restricted service area e.g., based on a service area list information that is optionally received in the registration accept message; and Whether the UE has successfully (previously) performed a PDU session modification procedure after an inter-system change from S1 mode to N1 mode, optionally for reporting the UE's 5GSM capabilities to the network, or the UE has (or has not) successfully (previously) performed a PDU session modification procedure after an inter-system change from S1 mode to N1 mode, optionally for reporting the UE's 5GSM capabilities to the network.

Figure 2:
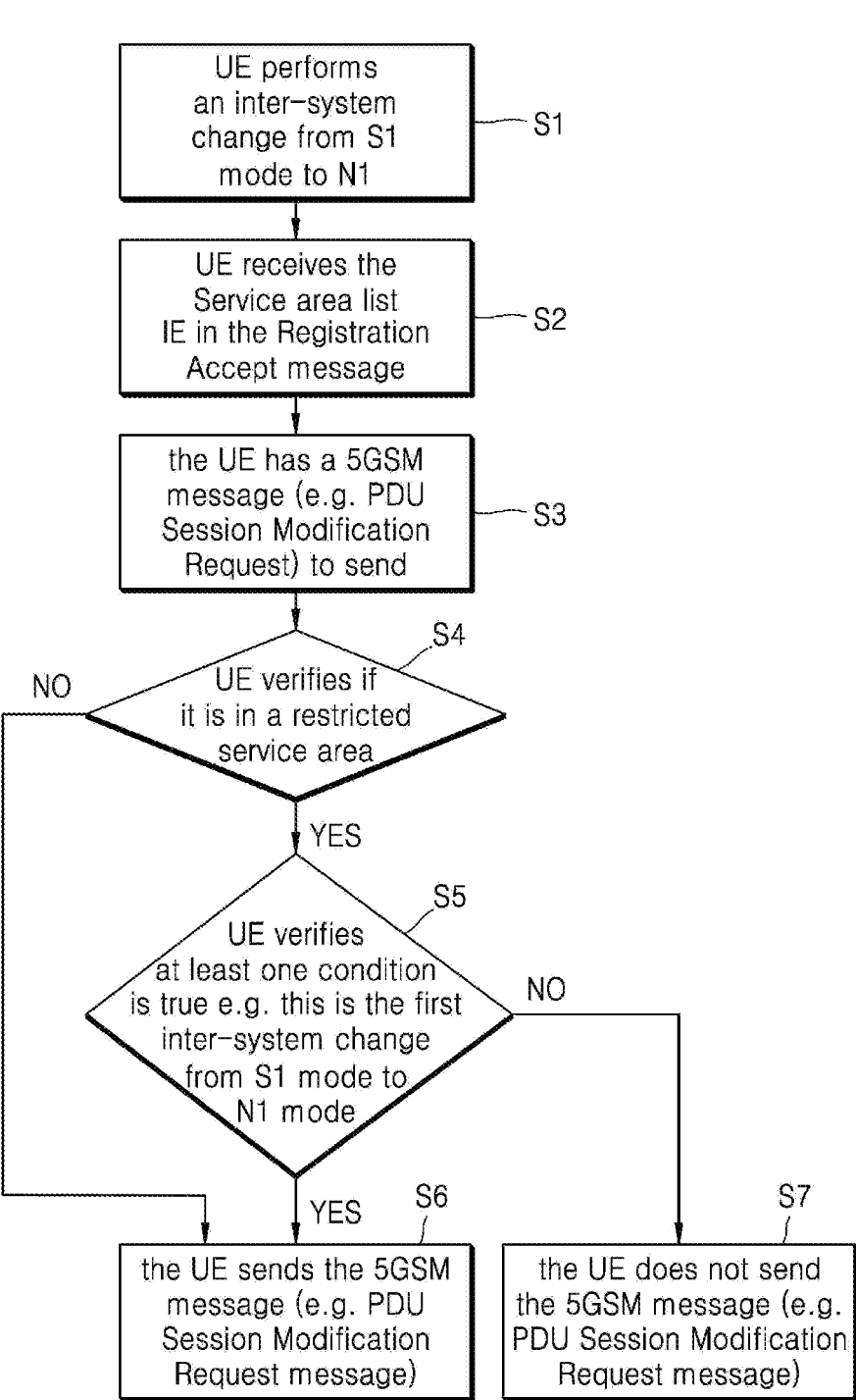
FIG. 2 illustrates a flowchart according to a first embodiment of the present disclosure.

FIG. 2 illustrates one example embodiment, noting that this is an example only and is not intended to be restricted to the particular steps and/or order of conditions and/or actions that are shown in the figure.

At S1, the UE performs an inter-system change from S1 mode to N1 mode.

At S2, the UE receives the service list (IE) in the registration accept message from the network.

At S3, the UE decides that the UE has to send a 5GSM message, such as PDU session modification request, to the network.

At S4, the UE determines if the UE is in a restricted service area (i.e., if the UE is in a non-allowed area or that the UE is not in an allowed area). If not, then at step S6, the UE sends the 5GSM message, such as PDU session modification request, to the network.

However, if at S4, the UE determined that the UE is in a restricted service area (i.e., the UE is in a non-allowed area or that the UE is not in an allowed area) then at S5 the UE verifies that at least one further condition is true, such as is this the first system change from S1 mode to N1 mode or that a PDU session modification procedure was not previously successfully performed to report the UE's 5GSM capabilities after an inter-system change from S1 mode to N1 mode. If this determination is false, then at S7, the UE does not send the 5GSM message, However, if the determination at S5 is true, then at S6, the UE sends the 5GSM message, since the exception applies and this is now permitted.

Note that for any embodiment herein, the UE being in a restricted area can mean that the UE is in a non-allowed area or that the UE is not in an allowed area. Also, the UE being in a non-restricted area (or the UE is not in a restricted area) can mean that the UE is in an allowed area or the UE is not in a non-allowed area.

When sending the 5GSM message as set out above, the UE may not include the request type IE in the UL NAS TRANSPORT message. This enables the AMF to determine that the 5GSM message is being sent due to an exception i.e., contrary to the prior art rules.

The access and mobility management function, AMF, for a UE that sends a 5GSM message from a restricted area (or from a cell that is in a restricted area or that is considered to be part of a restricted area for the UE), may determine whether or not to process the request (e.g., forward the 5GSM message in the UL NAS TRANSPORT message) based on the presence of the request type IE in the UL NAS TRANSPORT message. If the IE is present (optionally with the IE set to a particular or predetermined or predefined value), then the AMF may determine to not forward the 5GSM message to the SMF and the AMF may then send the 5GSM message that was not forwarded back to the UE (in a DL NAS TRANSPORT message) and include any existing 5GMM cause value. On the other hand, if the IE is not present, then the AMF may determine to forward the 5GSM message to the SMF.

Alternatively, if the AMF knows or determines that the UE in a question, which is a UE that is in a restricted service area, has performed the UE's first inter-system change from S1 mode to N1 mode and optionally the UE is sending a 5GSM message after this first inter-system change from S1 mode to N1 mode (optionally if other conditions that there were listed previously are also verified by the AMF and met) then the AMF may determine to forward the 5GSM message to the SMF.

In a further embodiment, the UE waits to leave the restricted area before sending the 5GSM message. This embodiment requires that the UE may also verify a set of conditions such as those that have been listed earlier. For example:

the UE is operating in single registration mode;

the network supports N26 interface;

the UE is performing the UE's first inter-system change from S1 mode to N1 mode, or the UE has not successfully (previously) performed a PDU session modification procedure after an inter-system change from S1 mode to N1 mode optionally for reporting the UE's 5GSM capabilities to the network;

the UE has at least one PDN connection that was first established in S1 mode; and the UE is in a restricted service area.

If any combination of the above is met, and if, optionally, the UE determines that the UE is in a restricted service area (e.g., based on the UE entering substate 5GMM-REGIS-TERED.NON-ALLOWED-SERVICE, or based on any other method as have been described earlier herein) but also the UE needs to send a 5GSM message (e.g., PDU session modification request message, for example because the UE needs to report the UE's 5GSM capabilities after a first inter-system change from S1 mode to N1 mode), then the UE may decide to not send the 5GSM message until the UE is no longer in a restricted area (e.g., after the UE enters substate 5GMM-REGISTERED.NORMAL-SERVICE optionally after leaving the substate 5GMM-REGIS-TERED.NON-ALLOWED-SERVICE).

For this, the UE may save or remember that the UE needs to send the 5GSM message as soon as the UE enters substate 5GMM-REGISTERED.NORMAL-SERVICE optionally after leaving the substate 5GMM-REGISTERED.NON-AL-LOWED-SERVICE. When the UE enters substate 5GMM-REGISTERED.NORMAL-SERVICE, the UE may verify if the UE has performed a first inter-system change from S1 mode to N1 mode. If yes, and optionally if the UE determines that the UE has not yet performed a PDU session modification procedure (i.e., the UE has not yet sent the PDU session modification request message) for at least one PDU session (or PDN connection, which was first established in S1 mode), then the UE may perform the PDU session modification procedure (i.e., the UE sends the PDU session modification request message) in order to indicate or report the UE's 5GSM capabilities to the SMF.

Figure 3:
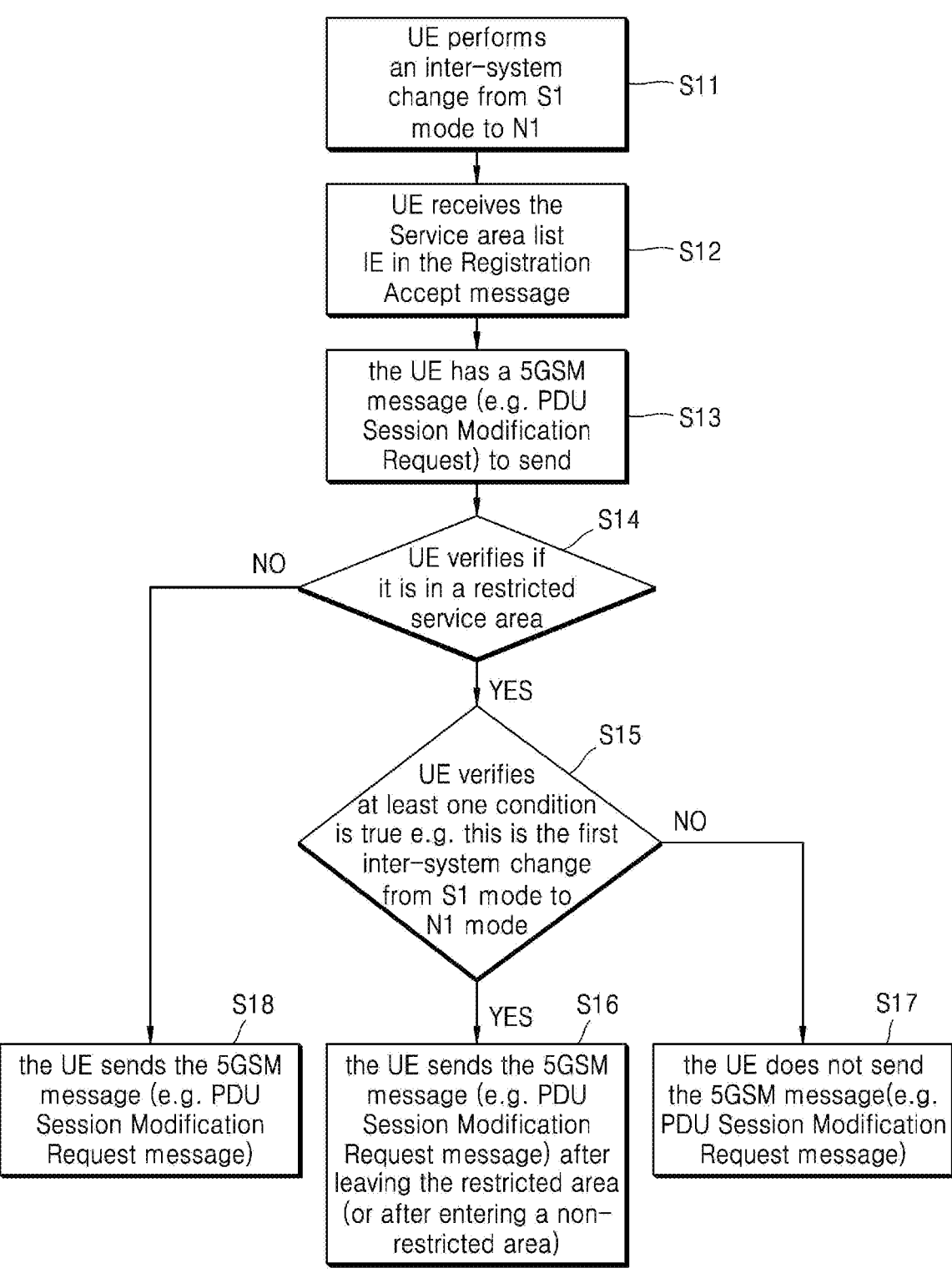
FIG. 3 illustrates a flowchart according to a second embodiment of the present disclosure.

FIG. 3 illustrates a flowchart related to the above-mentioned embodiment.

At S11, the UE performs an inter-system change from S1 mode to N1 mode.

At S12 the UE receives from the network the service Area list IE in the registration accept message.

At S13, the UE has a 5GSM message (e.g., PDU session modification request) to send to the network.

At S14, the UE verifies if the UE is in a restricted service area. If not, then at S18, the UE sends the 5GSM message to the network.

However, if at S14, the UE verifies that the UE is in a restricted service area, then at S15, the UE verifies if at least one further condition is true, such as at least one of the examples listed above. If no such condition is true, then at S17, the UE decides not to send the 5GSM message.

If, at S15, the UE verifies that the at least one further condition is true, then at S16, the UE sends the 5GSM message after leaving the restricted area or after entering a non-restricted area.

By means of the aforementioned embodiments, a UE, upon performing an inter-system change from S1 to N1 mode which results in the UE being in a restricted service area, is able to send a 5GSM message to the network, contrary to the situation which would otherwise exist in the prior art, which presents a contradiction which could result in unpredictable behaviour. By means of the specific exception created by embodiments of the present disclosure, proper and consistent behaviour is possible in the specific circumstances outlined.

Figure 4:
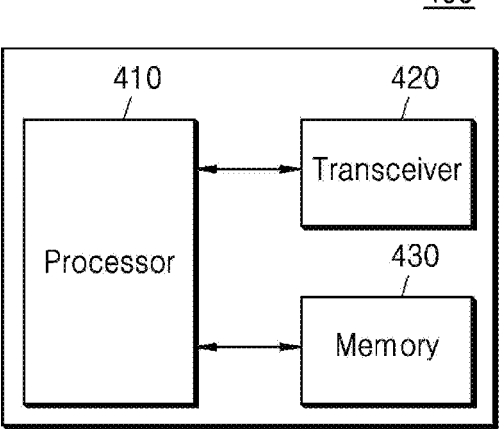
FIG. 4 illustrates a block diagram of a user equipment according to an embodiment of the disclosure.

FIG. 4 illustrates a diagram illustrating a UE 400 according to another embodiment of the present disclosure.

Referring to the FIG. 4, the UE 400 may include a processor 410, a transceiver 420 and a memory 430. However, all of the illustrated components are not essential. The UE 400 may be implemented by more or less components than those illustrated in FIG. 4. In addition, the processor 410 and the transceiver 420 and the memory 430 may be implemented as a single chip according to another embodiment.

The aforementioned components will now be described in detail.

The processor 410 may include one or more processors or other processing devices that control the provided function, process, and/or method. Operation of the UE 400 aforementioned in this disclosure may be implemented by the processor 410.

The transceiver 420 may include a RF transmitter for up-converting and amplifying a transmitted signal, and a RF receiver for down-converting a frequency of a received signal. However, according to another embodiment, the transceiver 420 may be implemented by more or less components than those illustrated in components.

The transceiver 420 may be connected to the processor 410 and transmit and/or receive a signal. The signal may include control information and data. In addition, the transceiver 420 may receive the signal through a wireless channel and output the signal to the processor 410. The transceiver 420 may transmit a signal output from the processor 410 through the wireless channel.

The memory 430 may store the control information or the data included in a signal obtained by the UE 400. The memory 430 may be connected to the processor 410 and store at least one instruction or a protocol or a parameter for the provided function, process, and/or method. The memory 430 may include read-only memory (ROM) and/or random access memory (RAM) and/or hard disk and/or CD-ROM and/or DVD and/or other storage devices.

Figure 5:
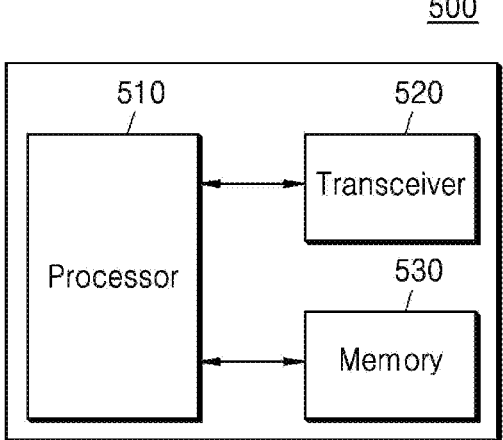
FIG. 5 illustrates a block diagram of a network entity according to an embodiment of the disclosure.

FIG. 5 illustrates a diagram illustrating a network entity 500 according to another embodiment of the present disclosure.

The network entity 500 may be a SMF aforementioned in this disclosure.

Referring to the FIG. 5, the network entity 500 may include a processor 510, a transceiver 520 and a memory 530. However, all of the illustrated components are not essential. The network entity 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the provided function, process, and/or method. Operation of the SMF in this disclosure may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the network entity 500. The memory 530 may be connected to the processor 510 and store at least one instruction or a protocol or a parameter for the provided function, process, and/or method. The memory 530 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as "component," "module" or "unit" used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a network, the method comprising:

establishing at least one protocol data unit (PDU) connection in an S1 mode;

performing an inter system change operation from the S1 mode to an N1 mode, wherein the S1 mode and the N1 mode are operation modes identified, respectively, in different networks; and in case that a successful UE-requested PDU session modification procedure is not previously performed and the UE is in a 5GMM-REGISTERED.NON-ALLOWED-SERVICE state, performing a UE-requested PDU session modification procedure to report $5^{th}$ generation session management (5GSM) capability of the UE after entering a 5GMM-REGISTERED.NORMAL-SERVICE state, wherein the 5GMM-REGISTERED.NON-ALLOWED-SERVICE state and the 5GMM-REGISTERED.NORMAL-SERVICE state are determined based on whether a tracking area identity (TAI) is included in a list of an allowed tracking area.

2. The method of claim 1, further comprising:

transmitting, to a session management function (SMF), a PDU session modification request including information associated with the 5GSM capability.

3. The method of claim 1, wherein the UE is in a single registration mode in the network supporting an N26 interface.

4. The method of claim 1, further comprising:

identifying an operation state as the 5GMM-REGISTERED.NON-ALLOWED-SERVICE state in case that a cell where the UE camps is located in a non-allowed tracking area, and identifying the operation state as the 5GMM-REGISTERED.NORMAL-SERVICE state in case that the cell where the UE camps is located in the allowed area.

5. A method performed by a session management function (SMF) in a network, the method comprising:

in case that an inter system change operation from an S1 mode to an N1 mode is performed at a user equipment (UE), a successful UE-requested protocol data unit (PDU) session modification procedure is not previously performed for the UE and the UE is in a 5GMM-REGISTERED.NON-ALLOWED-SERVICE state, receiving, from the UE, a PDU session modification request after a state of the UE is transited from the 5GMM-REGISTERED.NON-ALLOWED-SERVICE state to a 5GMM-REGISTERED.NORMAL-SERVICE state, wherein the S1 mode and the N1 mode are operation modes identified, respectively, in different networks, wherein the 5GMM-REGISTERED.NON-ALLOWED-SERVICE state and the 5GMM-REGISTERED.NORMAL-SERVICE state are determined based on whether a tracking area identity (TAI) is included in a list of an allowed tracking area; and obtaining information for the 5GSM capability from the PDU session modification request.

6. The method of claim 5, wherein at least one PDU connection is established by the UE in the S1 mode.

7. The method of claim 5, wherein the UE is in a single registration mode in the network supporting an N26 interface.

8. The method of claim 5, further comprising:

identifying an operation state as the 5GMM-REGISTERED.NON-ALLOWED-SERVICE state in case that a cell where the UE camps is located in a non-allowed tracking area, and identifying the operation state as the 5GMM-REGISTERED.NORMAL-SERVICE state in case that a cell where the UE camps is located in the allowed area.

9. A user equipment (UE) in a network, the UE comprising:

a transceiver; and a processor operably coupled with the transceiver and configured to:

establish at least one protocol data unit (PDU) connection in an S1 mode, perform an inter system change operation from the S1 mode to an N1 mode, and in case that a successful UE-requested PDU session modification procedure is not previously performed and the UE is in a 5GMM-REGISTERED.NON-ALLOWED-SERVICE state, perform a UE-requested PDU session modification procedure to report $5^{th}$ generation session management (5GSM) capability of the UE after entering a 5GMM-REGISTERED.NORMAL-SERVICE state, wherein the 5GMM-REGISTERED.NON-ALLOWED-SERVICE state and the 5GMM-REGISTERED.NORMAL-SERVICE state are determined based on whether a tracking area identity (TAI) is included in a list of an allowed tracking area, wherein the S1 mode and the N1 mode are operation modes identified, respectively, in different networks.

10. The UE of claim 9, wherein the processor is further configured to:

transmit, to a session management function (SMF), a PDU session modification request including information associated with the 5GSM capability.

11. The UE of claim 9, wherein the UE is in a single registration mode in the network supporting an N26 interface.

12. The UE of claim 9, wherein the processor is further configured to:

identify an operation state as the 5GMM-REGISTERED-.NON-ALLOWED-SERVICE state in case that a cell where the UE camps is located in a non-allowed tracking area, and identify the operation state as the 5GMM-REGISTERED-.NORMAL-SERVICE state in case that the cell where the UE camps is located in the allowed area.

13. A session management function (SMF) in a network, the SMF comprising:

a transceiver; and a processor operably coupled with the transceiver and configured to:

in case that an inter system change operation from an S1 mode to an N1 mode is performed at a user equipment (UE), a successful UE-requested protocol data unit (PDU) session modification procedure is not previously performed for the UE and the UE is in a 5GMM-REGISTERED.NON-ALLOWED-SERVICE state, receive, from the UE, a PDU session modification request from the UE after a state of the UE is transited from the 5GMM-REGISTERED-

18

.NON-ALLOWED-SERVICE state to a 5GMM-REGISTERED.NORMAL-SERVICE state, wherein the S1 mode and the N1 mode are operation modes identified, respectively, in different networks, wherein the 5GMM-REGISTERED.NON-AL-LOWED-SERVICE state and the 5GMM-REGIS-TERED.NORMAL-SERVICE state are determined based on whether a tracking area identity (TAI) is included in a list of an allowed tracking area, and obtain information for the 5GSM capability from the PDU session modification request.

14. The SMF of claim 13, wherein at least one PDU connection is established by the UE in the S1 mode.

15. The SMF of claim 13, wherein the UE is in a single registration mode in the network supporting a N26 interface.

16. The SMF of claim 13, wherein the processor is further configured to:

identify an operation state as the 5GMM-REGISTERED-.NON-ALLOWED-SERVICE state in case that a cell where the UE camps is located in a non-allowed tracking area, and identify the operation state as the 5GMM-REGISTERED-.NORMAL-SERVICE state in case that the cell where the UE camps is located in the allowed area.

* * * * *